United States Patent
Rieger

(10) Patent No.: US 8,219,674 B2
(45) Date of Patent: Jul. 10, 2012

(54) CROSS SYSTEM MONITORING AND RECONCILIATION COCKPIT

(75) Inventor: Lothar Rieger, Bammental (DE)

(73) Assignee: SAP AG, Walldorf (DE)

( * ) Notice: Subject to any disclaimer, the term of this patent is extended or adjusted under 35 U.S.C. 154(b) by 319 days.

(21) Appl. No.: 12/609,485

(22) Filed: Oct. 30, 2009

(65) Prior Publication Data

US 2011/0106858 A1 May 5, 2011

(51) Int. Cl.
*G06F 15/173* (2006.01)
(52) U.S. Cl. .................................................. 709/224
(58) Field of Classification Search ............ 709/223, 709/224
See application file for complete search history.

(56) References Cited

U.S. PATENT DOCUMENTS 7,634,528 B2 * 12/2009 Horvitz et al. ............... 709/200
7,844,704 B2 * 11/2010 Tamura ........................ 709/224
2007/0266045 A1 * 11/2007 Bansal et al. .............. 707/104.1

* cited by examiner

*Primary Examiner* — Yemane Mesfin
(74) *Attorney, Agent, or Firm* — Kenyon & Kenyon LLP

(57) ABSTRACT

The disclosed are a method and a system that may automatically monitoring message traffic between computer applications and using the monitoring data to reconcile databases associated with data related to the messages. The system may include a server, a cockpit monitoring module, a database, and a client terminal. The server may host a plurality of computer applications. The plurality of computer applications may operate on data records containing data. The data in the data records may be operated on by more than one of the plurality of computer applications. The computer applications may generate messages that may be related to the operations performed on the data in the data records. The messages may include information related to data records operated on by the plurality of computer applications. For example, the messages may contain information about the operations, the data, or other information related to the data and the application.

17 Claims, 3 Drawing Sheets

CROSS SYSTEM MONITORING AND RECONCILIATION COCKPIT

BACKGROUND OF THE INVENTION

Computer applications, such as ERP, CRM, SRM and other business management applications, perform functions that are inter-related. For example, in an ERP application, a user may make a vendor purchase of materials that will be used in a product that will be delivered to a customer. The customer may be managed using a CRM application that may contain data related to the product to be delivered to the customer. In the integrated business environment, the ERP application may send a message to the CRM application indicating that a data record within the CRM application needs to be updated, such as an accounts receivable entry or some other data record.

In conventional systems, these messages are only reviewable by information technology (IT) specialists, not the business people that are responsible for the data within the data records that are the subject of the messages. Therefore, the responsible business people may not be aware, or made aware, of errors that may occur with the messages or delays in processing the message without intervention by an IT specialist. This can be particularly troublesome during an audit or when accounts must be balanced. Most errors are based on the fact that the configuration or the attributes of master data in the receiving application do not allow the processing of the message, e.g. the message wants to update data in a cost center and this cost center is blocked for any update.

Accordingly, there is a need for an application that without outside intervention allows a business user to monitor message traffic related to commonly, or frequently, used applications, and to reconcile the data records related to the messages between the various integrated computer applications.

DETAILED DESCRIPTION

Figure 1:
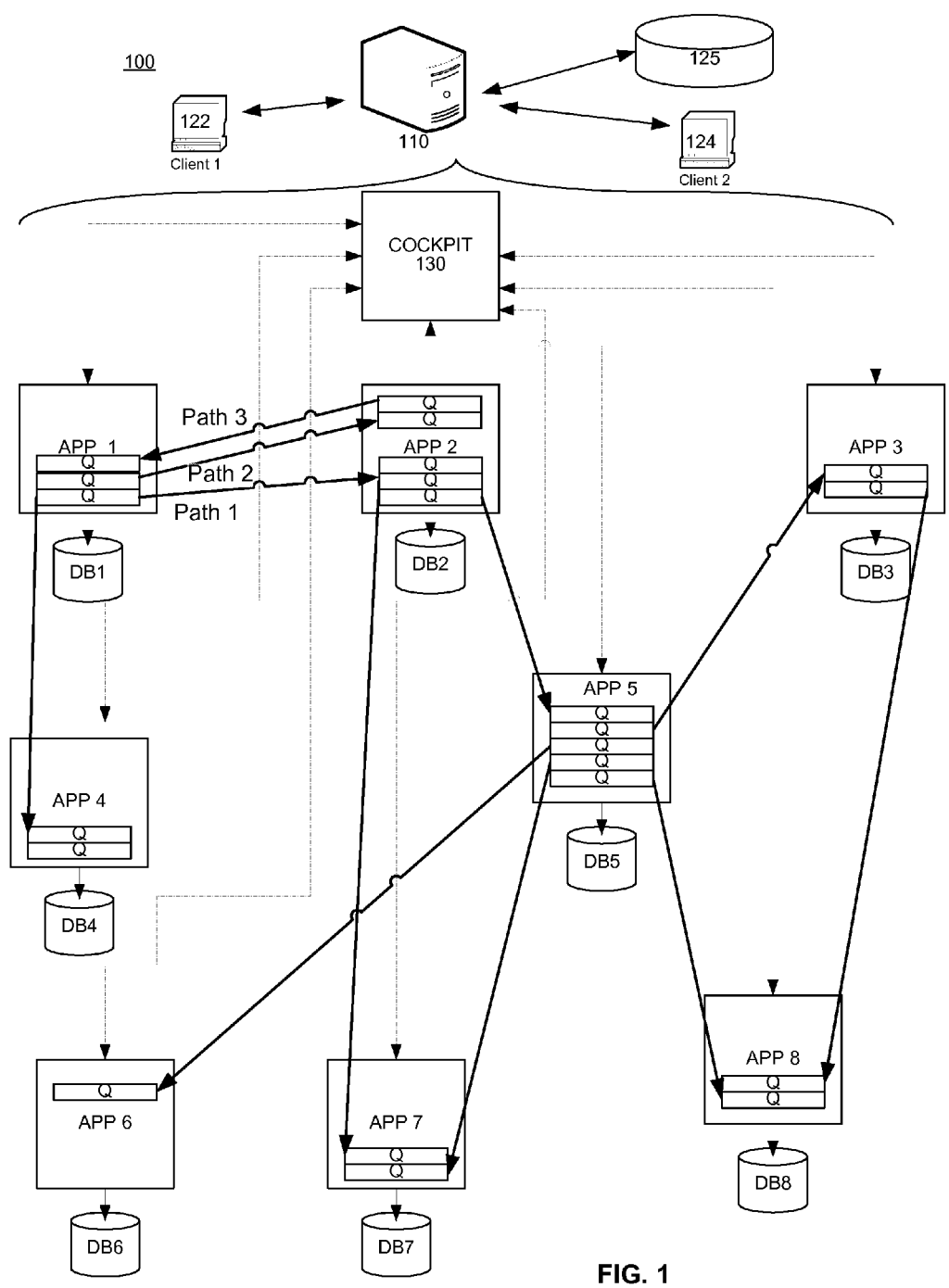
FIG. 1 illustrates a functional block diagram of an exemplary implementation of invention.

The disclosed exemplary embodiments provide a method and a system that may automatically monitoring message traffic between computer applications and using the monitoring data to reconcile databases associated with data related to the messages. The system may include a server, a cockpit monitoring module, a database, and a client terminal. The server may host a plurality of computer applications. The plurality of computer applications may operate on data records containing data. The data in the data records may be operated on by more than one of the plurality of computer applications. The computer applications may generate messages that may be related to the operations performed on the data in the data records, and exchange messages between each other via point-to-point message queues. The messages may include information related to data records operated on by the plurality of computer applications. For example, the messages may contain information about the operations, the data, or other information related to the data and the application. The applications may be applications for performing functions, such as invoicing, receiving, accounting, ordering, as are known in enterprise resource planning (ERP), customer relationship management (CRM), supply chain management (SCM), supplier relationship management (SRM), and/or product lifecycle management (PLM) systems.

The database may maintain the information related to data, application and/or message. The information may include a count of the number of messages exchanged between each of the respective computer applications of the plurality of computer applications. Alternatively, the information may include a count of the number of messages exchanged through each of the respective point-to-point message queue. The client terminal may interact with the plurality of computer applications to operate on the data records. This interaction may generate messages that may be exchanged between the plurality of computer applications with which the client terminal interacts. The cockpit monitoring module may collect data related to, and/or in the messages, such as, a count of the number of messages exchanged between the plurality of computer application. The cockpit monitoring module may perform operations on the collected information. For example, the operations may include comparing the count of messages to a count threshold. The cockpit monitoring module may present data related to the operations on the collected information, for example, in either a graphical user interface or in a printed report. The presented information may include indicators of whether any errors have occurred with the exchanged messages.

The cockpit monitoring module, executing on the server, may be configured to compare a count of total for messages sent by a first application to a second application with a count total of messages received by the second application from the first application. If a count does not match, the cockpit monitoring module may present an error message in the graphical user interface.

The cockpit monitoring module may be further configured to present a graphical representation of the number of messages exchanged between each of the plurality of computer applications. The number of messages that may be considered to have errors may be flagged for further consideration or review by the system or a user. Most errors may be based on the fact that the configuration or the attributes of master data in the receiving application may not allow the processing of the message. For example, the message may contain a data update in a cost center; however, the cost center may be blocked for any updates. In which case, the business user may reconcile the issue by unblocking or by redirecting the message to another cost center.

The cockpit monitoring module may also be configured to receive commands, for example, in response to user inputs to the graphical user interface. The cockpit monitoring module may also reconcile the data records of the databases for each of the respective applications based on the messaged indicated as having errors in the graphical user interface.

An exemplary implementation of an embodiment according to the present invention will be described with reference to FIG. 1. The system 100 may comprise one or more networked servers 110 that execute a multi-application software system, for example, in a networked business enterprise environment.

The servers 110 may include processor(s), internal memory, and related computer program instructions (not shown). The servers 110 may be configured to execute the instructions and functions of the cockpit monitoring module. Additionally, a processor may be configured to execute the instructions and functions that may be stored on the memory devices, internal memory, or both.

The servers 110 may include data storage device(s) 125 that store computer-readable software program instructions that may be accessed and executed by the processor(s) of the server 110, such as applications APPS 1-8 and cockpit 130. The data storage devices 125 may be, for example, hard drives, non-volatile memory, flash memory or other machine-readable storage media, which store instructions, such as APPS 1-8 or those for implementing instructions for executing a cockpit monitoring module. The program instructions may define various applications, shown as APPS 1-8 in FIG. 1, to be executed by the system 100. The storage device(s) 125 also may store data generated by the applications, shown as databases DB1-8.

The servers 110 may communicate with client terminal(s) 122, 124 via network connections. The client terminals 122, 124 may include a processor and data storage device (not shown), such as a hard disk. The client terminals 122, 124 may participate in execution of program instructions representing the applications APP 1-8 of the software system. The number of servers, number of clients and topology of the network connections between them are immaterial to the present discussion unless otherwise noted.

The organization of the software architecture may take various forms. The following is an exemplary description of the software architecture.

As noted, the servers 110 may execute program instructions representing various applications APPS 1-8. Each application of APPS 1-8 may execute independently of each other, but in a synchronized fashion. The applications APPS 1-8 may exchange data via point-to-point communication paths established between them. The applications APPS 1-8 may maintain communication queues for message exchange. For example, APP2 is illustrated as provided in communication with APPS 1, 5 and 7. Application APP 2, therefore, is illustrated as having three communications queues: one queue for reception of messages from APP1; one queue for transmission of messages to APP5; and one queue for transmission of messages to APP7. Thus, the applications APPS 1-8 can transfer messages between each other that cause receiving applications to update data in their databases. This mechanism allows the applications to execute independently but in a synchronized fashion.

The communication paths may be unidirectional and related to a particular message type. But there may be different paths for different message types and even in different directions. For example, a first path (path 1) from app1 to app2 for message type "invoices" and a second path (path 2) from app1 to app2 for message type "materials movements", and a third path (path 3) back from app2 to app1 for a message type "orders."

As shown in FIG. 1, the applications APPS 1-8 may communicate via messages with one another. For example, APP 1 may communicate a message containing data of a first data record and additional information, to APP 4, while APP 1 may send a message containing data of a second data record and additional information to APP 2. A communication path may exist between the cockpit 130 and each of the APPS 1-8 as shown in dashed lines in FIG. 1. The cockpit 130 can send and receive data and instructions to the APPS 1-8, either individually or en masse, over the respective communication paths.

The additional information in the messages communicated between computer applications, such as APP 1, APPS 2 and 4 may include identifying information related to the sending application, receiving application, subject matter of the message, data record identifiers and other information.

A process in the applications may maintain a TOTAL of the number of messages sent by each respective application to other applications as well as a TOTAL of the number of messages received from other applications. The cockpit monitoring module may receive or access the message information in the application, and may use the message totals maintained by the respective applications to determine system usage, and may identify areas where network loads are unbalanced.

For example, as shown in Table 1 below, APP 1 may send 100 messages to APP 2 and 300 messages to APP 4. A memory location in DB 1 may store the values 100 and 300 in a table data structure for the respective number of messages sent by APP 1 to the respective applications APP 2 and APP 4. Similarly, a memory location in DB 5 may store the value 219 in a table data structure for the respective number of messages sent by APP 5 to the respective applications APP 8. Of course, other types of data structures may be used.

TABLE 1

| SENDING APPLICATION | RECEIVING APPLICATION | TOTAL MESSAGES | ERRORS |
|---|---|---|---|
| APP 1 | APP 2 | 100 | 0 |
| APP 1 | APP 4 | 300 | 0 |
| APP 2 | APP 5 | 222 | 1 |
| APP 2 | APP 7 | 122 | 0 |
| APP 3 | APP 8 | 45 | 3 |
| APP 5 | APP 6 | 5 | 0 |
| APP 5 | APP 7 | 5 | 0 |
| APP 5 | APP 8 | 219 | 6 |

The system 100 may maintain the TOTAL number of messages for each connection between each application (e.g., from APP 1 to APP4, APP 3 to APP 2, APP 2 to APP 8) and, for example, each day, from 12 am one day to 12 am the next.

In one embodiment, an average of the number of messages may be determined and may be used as a benchmark, and/or the messages can be shown as percentages to indicate overall message traffic. The average and percentage data can used to identify whether any particular connection has an extraordinary load.

Referring back to FIG. 1, the cockpit application 130 may be hosted on the server 110 and/or client terminals 122 and 124, and may be used to monitor the messages exchanged between computer applications APPS 1-8. The cockpit application 130 may be executed on the server 110 in a software layer different from the computer applications APPS 1-8. The cockpit 130 may alternatively be installed either in a particular application, such as a central finance application, on any other instance of an application like a master data hub, or in a manager function, for example, hosted on server 110 that provides computer applications APPS 1-8. The cockpit application 130 may obtain information from (via, for example, a pull operation), or be provided with information from (via, for example, a push operation), or by exchanging requests with, a so-called middleware. The middleware may be necessary to support the message processing between the different applications APPS 1-8. The middleware releases the cockpit application 130 from having to directly interface with the APPS 1-8. Of course, the APPS 1-8 may be configured to directly interface with the cockpit application 130, and may even include the functionality of cockpit application 130.

Figure 2:
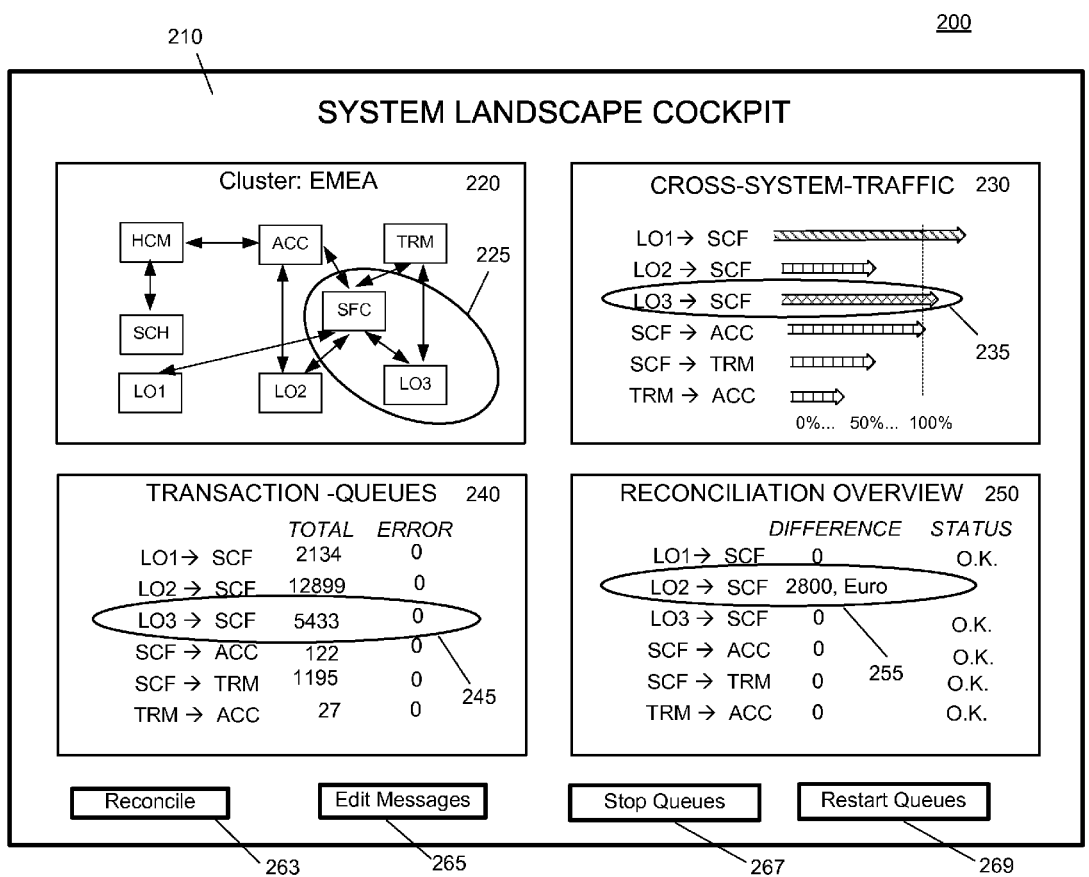
FIG. 2 illustrates an example of the information that may be presented in the graphical user interface.

The between-application monitoring performed by the cockpit application 130 may be presented graphically in a graphical user interface for user analysis and action. The graphical user interface may be viewed and interacted with via a client terminal, such as client terminals 122 and/or 124. FIG. 2 illustrates an example of the information that may be presented in the graphical user interface.

The cockpit module 130 of FIG. 1, for example, may generate a graphical user interface 200 that presents the following system landscape presentation, or cockpit presentation 210. The cockpit presentation 210 may comprise a number of dashboards: a dashboard 220 may indicate a graphic indicating the system mapping; a dashboard 230 may indicate data representative of cross system traffic, or system load; a dashboard 240 may indicate the number of messages in the transaction queues; and a dashboard 250 may indicate an overview of the reconciliation processes.

For example, within the cockpit presentation 210, a plurality of different data presentations may be made to a user regarding messages generated by the plurality of computer applications. The interaction of the plurality of computer applications may be shown in a dashboard 220 illustrating the system mapping. The exemplary system mapping of dashboard 220 may be called a cluster that represents the Europe-Middle East-Africa (EMEA) region of the particular business enterprise. For example, peer-to-peer connections 225 may be shown by arrows. The peer-to-peer connections 225 can be determined using, for example, system identifiers. The connecting arrows (in connection 225) indicate that asynchronous messages are being exchanged between a first peer, e.g., SCF, or synchronous collaboration framework, to a second peer, e.g., LO3, or logistics layer.

The cross system traffic dashboard 230 may provide an indication(s) of the amount of message traffic, for example, from a first peer to a second peer. For example, for each connection 235 and for an arbitrary time period, such as, for example, each day or a 24 hour period, the system may retain the total number of messages in the arbitrary time period exchanged between respective peers. This total number of messages may be filtered for messages of each of the respective applications, and/or even specific messages, such as invoice-related messages or ordering-related messages, between the first peer and the second peer. The arbitrary time period may be changed by a user to any time period measured in months, days, hours, minutes or seconds.

The system 100, using the total number of, or a sample of the total number of, messages exchanged, may calculate an average of the total exchanged messages, which may be used as a benchmark and may be used to set a 100% level of traffic. The cross system traffic graphical view 230 may show an actual count of exchanged messages on this percentage scale. This allows a business user to graphically see whether a particular connection has an extraordinary load. Of course, visual (e.g., color coding or flashing), audible (e.g., beeps of different tones or frequency), and/or tactile (e.g., vibration) alarms may be used singularly or in any combination to provide warnings or alerts to conditions that may need user attention.

Each connection may be color coded to indicate a load status. For example, connection 235, which is colored "yellow", may indicate a warning that the load has crossed a warning threshold and may be approaching a level (red, for example) that will require immediate user attention or may result in errors. Meanwhile, the color "green" may indicate the system load is operating at an optimal performance level.

If other system load balancing tools are installed (for example, on a server, or in a respective application), it may be possible to have a user-actuated link or control button to them for more detailed analysis, which may not be part of this business user view.

The transaction queue view 240 may show the peer-to-peer link, a counter showing a number of transactional messages in a predetermined time period, such as, for example, between beginning of the day (12:00 am) and, for example, 3:00 pm. The next column may, for example, show a number of messages which are in an error status. Additional columns may be shown that may indicate the date and time of the oldest error message, and the like.

The reconciliation overview 250 may provide an overview of the reconciliation efforts of a user to resolve the errors presented in, for example, the transaction queue dashboard 240. Reconciliation may be considered to occur when an error message is resolved, such as by manually storing the data in the erroneous message to the correct database, causing the message to be resent, deletion of the erroneous message. As mentioned previously, most errors are based on the fact that the configuration or the attributes of master data in the receiving application do not allow the processing of the message, e.g. the message wants to update data in a cost center and this cost center is blocked for any update.

By interacting with the cockpit graphical user interface 200, the business user may solve the issue by unblocking or by redirecting the message to another cost center. Using graphical user interface controls, for example, by activating control 265, a user may call editor functions that allow a user to drill down to the particular attributes of the erroneous messages, and allow a user to repair the erroneous messages, and restart them. In addition, graphical user interface controls, for example, by activating control 263, may allow a user to call reconciliation programs in different instances, or perform functions to stop connections to systems that may be shut down, and to restart queues after the end of a shutdown.

The cockpit 130 may also use other data collected by the system 100 to generate other tables that may be useful to a user, for example: tables describing the systems and their roles (applications to be used); tables describing the legal corporate entities and which systems support the respective entities; and tables describing the installed applications and their releases; and user interface views concerning load balance, transaction counts and error counts may also be generated and presented simultaneously, or in different instances.

The system landscape may be used for a single enterprise (e.g., business operation) for which the cockpit 130 may monitor message traffic between different applications within the system landscape of the enterprise. A number of business users may participate in the functioning of the enterprise. But there are different business users responsible for different message types, e.g. one message type may be for all vendor invoices, another message type may be for all purchase orders, and each of the business users may have a "filter" on the respective messages monitored by the business user. In this example, the business user responsible for vendor invoices may "filter" the messages, so only indications related to the vendor invoices are shown in the user's cockpit presentation 210.

It is possible during business operations that messages between applications may be delayed, corrupted, inadvertently sent, or may have any variety of errors, either with or without the responsible business user's knowledge. To correct these types of errors, the business user may interact with the cockpit presentation 210 to reconcile the errors, or avert potential errors, for example, by activating control 263.

Cockpit 210 may also perform a cross-system-workflow function that may allow a user to inform another user to take an action, such as change a customized mapping rules in order to correct the erroneous situation. In some situations, it may be sensible to stop further sending of a particular type of message, for example, when all of the messages of that particular type end in the failure queue due to severe and/or non-repairable reasons, or some other condition. It may be possible to disable these transactions, for example, by a user activating control 267.

Additionally, the system 100 may have a setting to indicate, for example, that the queue is stopped, and a warning message may be sent to the sending systems indicating that the completion of the transactions in the receiving system may be delayed by several hours. Or it may set a warning that the transactions already in the sending system can not be completed.

After resolving the underlying problem, the queue can be restarted, for example, by activating control 269. Additionally, when a system has to be shut down, for example, for maintenance, it may be possible to block all connections to this system to avoid filling the queue with messages that may not be operated on for a period of time.

Besides the analysis of single error messages, it may be possible to reconcile database tables in the different systems periodically based on a total number of messages in a queue, if the different systems are synchronized. For example, for each transaction type, key performance indicators (KPIs) may be defined for the two systems to be compared. The KPIs may be organized, for example, in a table format. In these tables, it may be possible to summarize by, for example, posting period and company code and/or plant. There may be predefined reconciliation programs per KPI that can be started from the cockpit 210 for background processing. The results may be stored centrally, for example in data storage device 125, and presented together with a time stamp in a dashboard. Continuing with the example, after some forward-error-handling activities, reconciliation programs may be started again, and the program logs stored until all errors are corrected. These program logs may be used as Sarbanes-Oxley (SOX) evidence or incorporated quality control (IKS) documentation together with the overview screen.

Figure 3:
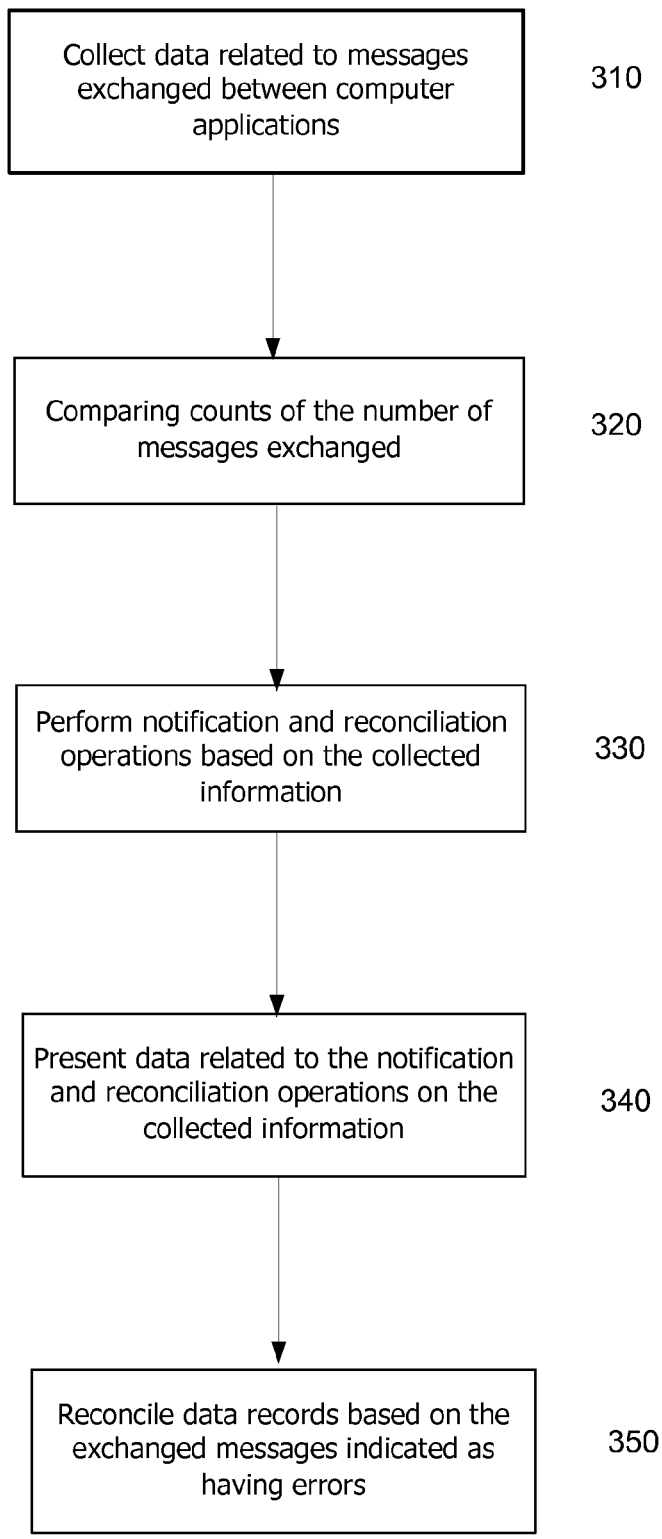
FIG. 3 illustrates an exemplary method according to an embodiment of the present invention.

FIG. 3 illustrates an exemplary method according to an embodiment of the present invention. As explained above, the cockpit application 130 may monitor messages exchanged by exchanging messages between computer applications operating on a server. During the monitoring of the exchanged messages, the cockpit application 130 may collect data related to, and including, a count of the number of messages exchanged between computer applications operating on the server (step 310).

The cockpit application 130 may analyze the data related to the exchanged messages with respect to data stored in a database, such as database 125. As part of the analysis, a count of total for messages sent by a first application to a second application may be compared with a count total of messages received by the second application from the first application (step 320). If the count does not match, an error message may be presented in the graphical user interface. Based on the analysis, notification and reconciliation operations may be perform on the collected information (step 330). Data related to the notification and reconciliation operations on the collected information may be presented in a graphical user interface (step 340). The presented information may indicate at least whether any errors have occurred with the exchanged messages. Based on inputs to the graphical user interface, the data records based on the messages indicated as having errors may be reconciled (step 350).

The analysis may include comparing a count of total for messages sent by a first application to a second application with a count total of messages received by the second application from the first application. If the count does not match, an error message may be presented in the graphical user interface. The graphical user interface may be generated by the cockpit application 130.

The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored in a machine readable medium. The "machine readable medium" may include any medium that can store information. Examples of a machine readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A system for reconciling message traffic in a network environment, comprising:
   a server for hosting a plurality of computer applications, wherein the computer applications exchange messages between each other via point-to-point message queues;
   a database for maintaining information related to and including a count of the number of messages exchanged through each of the respective point-to-point message queues;
   a client terminal for interacting with the plurality of computer applications to operate on data records; and
   a cockpit monitoring module configured to:
     collect the data related to and including the count of exchanged messages, the data including a first count total of messages sent by a first application to a second application and a second count total of messages received by the second application from the first application,
     compare the first count total to the second count total,
     if the first and second count total do not match, present, in a graphical user interface, indicating that an error has occurred with at least one exchanged message, and
     responsive to a user action, perform a reconciliation operation, wherein the reconciliation operation includes one of unblocking the at least one exchanged message associated with the error and redirecting the at least one exchanged message.

2. The system of claim 1, wherein the cockpit monitoring module is further configured to:
   present a graphical representation of the number of messages exchanged between each of the respective point-to-point message queues, wherein the number of messages that are considered to have errors is also presented; and receive commands, in response to user inputs to the graphical user interface, to reconcile the data records of the databases for each of the respective applications based on the messages indicated as having errors in the graphical user interface.

3. The system of claim 1, wherein the data records are repaired by a user accessing the data records via the graphical user interface.

4. The system of claim 1, wherein the plurality of computer applications operate on data records containing data that is operated on by more than one of the plurality of computer applications.

5. The system of claim 1, wherein the messages include data related to data records operated on by the plurality of computer applications.

6. The system of claim 1, wherein the count of the number of exchanged messages is filtered to include only the number of a particular type of message.

7. The system of claim 1, wherein the particular type of message is at least one of an invoicing type, an ordering type, and a vendor type.

8. The system of claim 1, wherein the cockpit monitoring module is executing on the server.

9. The system of claim 1, the cockpit monitoring module is further configured to:
if a number of messages associated with errors is above a threshold, then, responsive to another user action, disable a transaction associated with the messages.

10. A method for reconciling message traffic in an enterprise network environment, comprising:
exchanging messages between computer applications operating on a server;
collecting data related to and including a count of the number of messages exchanged between computer applications operating on the server, the data including a first count total of messages sent by a first application to a second application and a second count total of messages received by the second application from the first application;
comparing the first count total to the second count total;
if the first and second count total do not match, presenting, in a graphical user interface, information indicating that an error has occurred with at least one exchanged message; and
responsive to a user action, performing a reconciliation operation, wherein the reconciliation operation includes one of unblocking the at least one exchanged message associated with the error and redirecting the at least one exchanged message.

11. The method of claim 10, wherein the presenting, comprises:
presenting a number of messages exchanged between each of the plurality of computer applications including presenting messages having errors in the graphical user interface.

12. The method of claim 10, further comprises:
receiving commands, in response to user inputs to the graphical user interface, to reconcile the data records for each of the respective applications based on the messages indicated as having errors.

13. The method of claim 10, wherein the collecting and comparing is performed by a cockpit monitoring module.

14. The method of claim 10, wherein the messages exchanged by the computer application are exchanged between point-to-point messaging queues maintained by each of the respective computer applications.

15. The method of claim 10, further comprises:
if a number of messages associated with errors is above a threshold, then, responsive to another user action, disabling a transaction associated with the messages.

16. A non-transitory machine-readable storage medium embodied with machine-readable instructions, the instructions causing a machine to execute a method for reconciling message traffic in an enterprise network environment, comprising:
collecting data related to and including a count of messages exchanged between computer applications in a networked enterprise environment, the data including a first count total of messages sent by a first application to a second application and a second count total of messages received by the second application from the first application;
comparing the first count total to the second count total;
if the first and second count total do not match, presenting, in a graphical user interface, information indicating that an error has occurred with at least one exchanged message; and
receiving commands, in response to user inputs to the graphical user interface, to perform a reconciliation operation on the data records for each of the respective applications based on the at least one exchanged message indicated as having an error, wherein the reconciliation operation includes one of unblocking the at least one exchanged message and redirecting the at least one exchanged message.

17. The non-transitory machine-readable storage medium of claim 16, further comprising:
if a number of messages associated with errors is above a threshold, then, responsive to user inputs, disabling a transaction associated with the messages.

* * * * *